June 7, 1955 F. KESSLER 2,710,311

INCOMING TRUNK FOR TELEPHONE SYSTEMS

Filed Jan. 4, 1952

INVENTOR.
FRANK KESSLER

BY

J. L. Bowes

ATTORNEY

United States Patent Office 2,710,311

Patented June 7, 1955

2,710,311

INCOMING TRUNK FOR TELEPHONE SYSTEMS

Frank Kessler, Los Angeles, Calif., assignor to Stromberg-Carlson Company, a corporation of New York Application January 4, 1952, Serial No. 264,955

7 Claims. (Cl. 179—84)

Figures 1, 2:
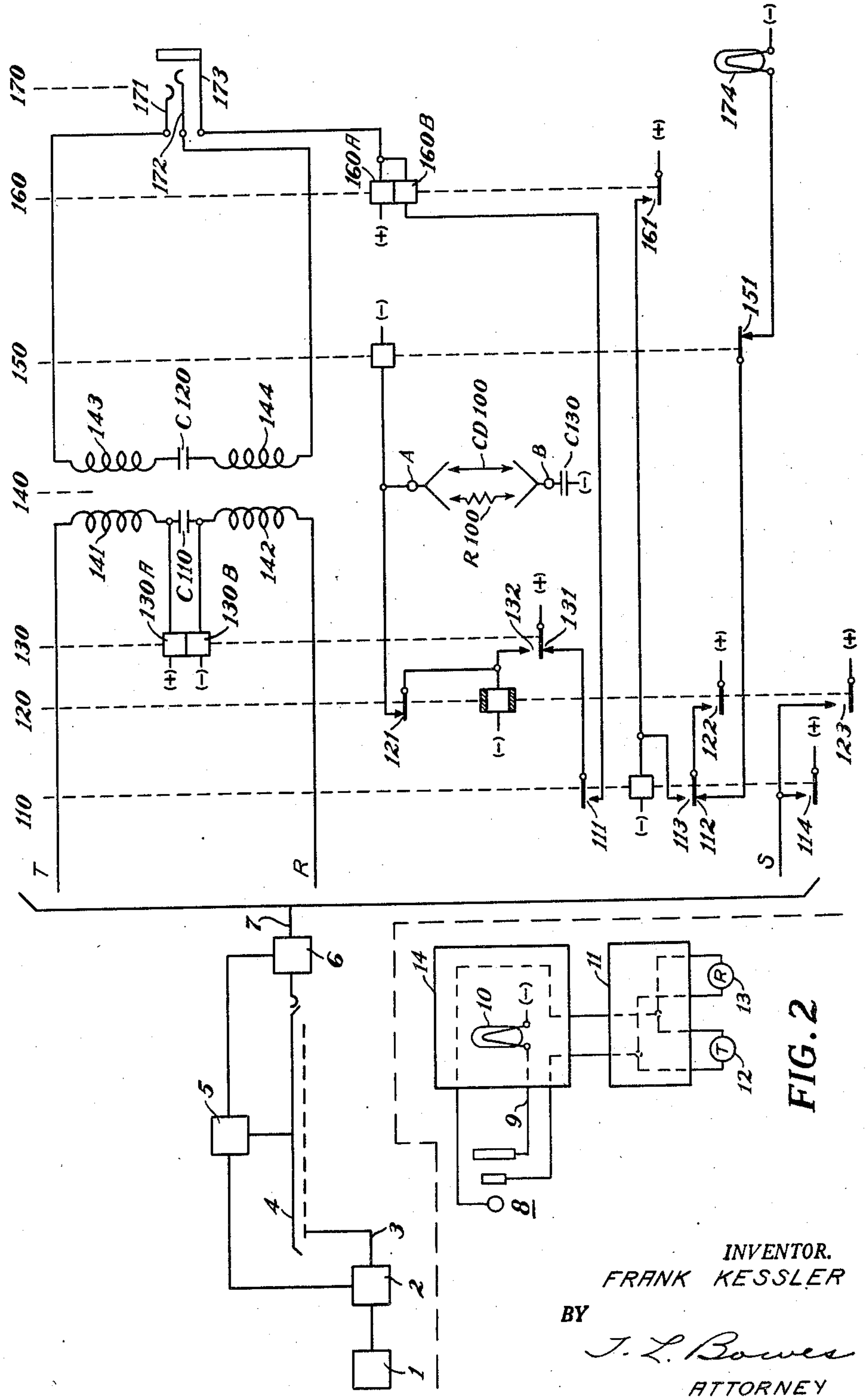

This invention relates to telephone systems and more particularly to incoming trunk circuits to operator positions.

In previous circuits of this type, provision has been made for signalling an operator position on an incoming call by lighting the answer lamp immediately upon seizure of the trunk circuit by the calling subscriber.

It is the object of my invention to provide for delaying the lighting of the answer lamp until the intermediate equipment has had sufficient time to connect the calling subscriber to the incoming trunk.

The features of my invention which I believe to be novel, are set forth with particularity in the appended claims. My invention itself, both as to its organization and manner of operation, together with further objects and advantages thereof, may best be understood by reference to the following description taken in connection with the accompanying drawing in which the incoming trunk circuit embodies the principles of my invention.

In the drawing, there is illustrated, partially in block diagram form, several of the components of an automatic telephone system, each of the blocks of which may be entirely conventional, and any components known to the art may be utilized for the designated functions and purposes.

Thus, in Fig. 1, a suitable subscriber's instrument, indicated by numeral 1, terminates, by means of line conductors, in line equipment 2 which in turn is connected as indicated by numeral 3 to a terminal in bank 4 of line finder 6 which seeks the position of the calling subscriber's line equipment 2 by means of a suitable switching means in a manner well known in the art. For convenience, only one level of contacts in bank 4 is shown. The operation of line finder 6 is controlled by an allotter 5 which assigns the line finder to search for the particular subscriber's line circuit 2 in a manner also well known in the art. Line finder 6 may be directly connected to the incoming trunk circuit by conductors T, R and S, as indicated by the numeral 7.

Also shown in block form in Fig. 2 are several of the components of the cord circuit in the operator position: plug 8 inserted in jack 170 connects the operator's transmitter 12 and receiver 13 to the trunk via operator's position circuit 11 and cord circuit 14. Plug 8 also connects sleeve 173 of the jack to cord circuit supervisory lamp 10.

There follows a detailed description of a call extended from a calling subscriber station 1 to an operator's position with the answer signal delay feature provided in accordance with my invention. Before going further with the description, I wish to point out a wiring option between points A and B in Fig. 1. The reason for this will be explained later. For the present case it will be assumed in the following description that conductor CD–100 is used to connect points A and B; and that resistor R–100 is omitted.

Upon removal of the calling subscriber's receiver or handset, finder 6 is started in its well-known searching function for subscriber's line equipment 2. As the line finder is seized for this searching operation, a loop circuit is connected across conductors T and R, to prepare the incoming trunk circuit for subsequent holding of the finder and line equipments. This loop circuit across the conductors T and R operates calling bridge relay 130 from the positive grounded battery pole indicated by symbol (+) and hereinafter referred to as ground, coil winding 130A, repeating coil winding 141, conductor T, the calling loop circuit, conductor R, repeating coil winding 142, and coil winding 130B, to the negative, ungrounded battery pole, indicated by symbol (−) and hereinafter referred to as battery to seize the incoming trunk. Capacitor C110 completes the talking path between repeating coil windings 141 and 142.

Operation of calling bridge relay 130 connects ground through operated springs 132 and coil winding of release delay relay 120 to battery, and also momentarily through normally closed contacts 121 and coil winding of signal delay relay 150 to battery. Momentary ground connected to the coil winding of relay 150 and conductor CD–100 also charges electrolytic capacitor C130 to battery connected to its negative terminal thereby delaying the operation of relay 150 until such time as capacitor C130 has become charged.

The momentary ground on normally closed springs 121 is disconnected when release delay relay 120 operates at a predetermined time interval after the operation of relay 150, the length of the time interval being determined by the charging time of capacitor C130 in addition to the operating time of relay 120 which is made longer by virtue of the presence of a copper slug on its score. Signal delay relay 150 then remains operated while electrolytic capacitor C130 is discharging through the coil winding of relay 150 to battery.

When signal delay relay 150 releases upon sufficient discharge of capacitor C130 answer lamp 174 is energized from ground, through operated contacts 122, normally closed contacts 112 and 151, and answer lamp 174 to battery. Thus the operate time period of relay 120 plus the release time period of relay 150 is utilized to delay the lighting of answer lamp 174 until finder 6 has had time to find the calling subscriber's line circuit 2.

Operation of release delay relay 120 also connects ground through operated contacts 123 to conductor S, to hold the preceding equipment until the calling subscriber restores the receiver or handset. Release delay relay 120 has a delayed release characteristic in order to remain operated if the calling subscriber should continue to dial after seizure of this incoming trunk circuit.

To answer the incoming call indicated by the lighting of answer lamp 174, the operator inserts plug 8 of cord circuit 14 into the answer jack 170 to connect the operator's position circuit 11 to the incoming subscriber through conductor 171, repeating coil winding 143, capacitor C120, repeating coil winding 144 and conductor 172.

Insertion of the plug into answer jack 170 also connects supervisory battery through lamp 10, cord sleeve 9, jack conductor 173, and high resistance coil winding 160A to ground to operate sleeve relay 160 but not to light the supervisory lamp 10 in the cord circuit.

Operation of sleeve relay 160 connects ground through operated contacts 161 and coil winding of sleeve hold relay 110 to battery, to operate sleeve hold relay 110.

Operation of sleeve hold relay 110 completes its own locking circuit from ground through operated contacts 122 and 113 so that both release delay relay 120, held by the calling subscriber, and sleeve relay 160, held by the plug in jack 170, must be restored before the answer lamp can relight. Operation of sleeve hold relay 110 also connects a multiple ground through operated contacts 114 to conductor S to hold the preceding equipment.

Operaton of sleeve hold relay 110 also prepares a circuit so that when the calling subscriber restores the receiver or handset at the completion of conversation, ground is connected, by the release of calling bridge relay 130, through closed contacts 131, operated contacts 111, low resistance coil winding 160B, and conductor 173 to the cord supervisory lamp. The cord supervisory lamp lights through the low resistance coil winding 160B to inform the operator that plug 8 may be removed from answer jack 170. Removal of the cord plug restores relays 160 and 110 to disconnect ground through contacts 114 from conductor S so that the incoming trunk may be used for succeeding calls.

As has been pointed out previously, the description covers the case where the electrolytic capacitor C–130 is operated in parallel with delay relay 150 through conductor CD–100. This was done for the purpose of simplifying the explanation. However, while the circuit will function as described, the transient currents that result from connecting a large capacitor, such as C–130, across battery and ground through relay contacts will exceed the contact current rating and may result in the rapid deterioration of the contacts. For this reason a resistor such as R–100 is usually placed in series with the capacitor; resistor size is selected to hold down the transient currents flowing through the relay contacts to their rated capacity but is kept low enough to insure a full charge on the capacitor at the time the contacts of the charging circuit are opened.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In a telephone system, an operator position, an incoming trunk having a termination in said operator position, a signal device at said operator position, a circuit for controlling the energization of said signal device, a circuit controlling device, means responsive to seizure of said trunk for controlling the operation of said circuit controlling device, and other means energized responsive to seizure of said trunk and operative at a predetermined interval following operation of said seizure responsive means, said circuit controlling means and said other means jointly governing the energization of said circuit to operate said signaling device a predetermined time after seizure.

2. In a telephone system, an operator position, an incoming trunk having a termination at said operator position, a signal device at said operator position, a control circuit for energizing said signal device, a first relay, a second relay, means responsive to seizure of said trunk for operating said first relay, and for energizing said second relay, means for delaying the operation of said second relay a predetermined interval of time after the operation of said first relay, means responsive to the operation of said first relay for opening said control circuit, means responsive to the operation of said second relay for de-energizing said first relay, means for holding said first relay operated a predetermined interval of time after the operation of said second relay, and means responsive to the release of said first relay and operation of said second relay for energizing said control circuit and energizing said signal device.

3. In a telephone system, an operator position, an incoming trunk having a termination at said operator position, an incoming signal device at said operator position, a circuit for energizing said signal device, first, second and third relays, means for operating said third relay in response to the seizure of said trunk, means for energizing and thereafter operating said first and said second relays in response to the operation of said third relay, operation of said first relay being effective to hold open said incoming signal circuit, means for delaying the operation of said first and said second relays a predetermined interval of time following their energization, operation of said second relay being effective to release said first relay for energizing said incoming signal circuit when said first relay releases.

4. In a telephone system, an operator position, an incoming trunk having a termination at said operator position, an incoming signal device at said position, a circuit for energizing said incoming signal device, a calling bridge relay operated in response to the seizure of said trunk, a signal delay relay, a release delay relay, said signal delay relay and said release delay relay energized and thereafter operated in response to the operation of said calling bridge relay, operation of said release delay relay being effective for holding open said incoming signal circuit, means for delaying the operation of said first and said second relays a predetermined interval of time following their energization, operation of said release delay relay being effective to de-energize said signal delay relay to complete a circuit for energizing said incoming signal circuit when said signal delay relay releases.

5. In a telephone system, an operator position, an incoming trunk having a termination at said operator position, an incoming signal device at said position, a circuit for energizing said incoming signal device, a calling bridge relay operated responsive to seizure of said trunk, a signal delay relay and a release delay relay, said signal delay relay and said release delay relay energized and thereafter operated responsive to operation of said calling bridge relay, operation of said signal delay relay being effective for holding open said incoming signal circuit, means for rendering said signal delay relay and said release delay relay slow-to-operate, means controlled by said release delay relay for making said trunk busy and de-energizing said signal delay relay, said means for rendering said signal and said release delay relays slow-to-operate being also effective for rendering said signal delay relay slow-to-release responsive to operation of said release delay relay and means jointly controlled by said signal delay and said release delay relays for energizing said incoming signal circuit when said release delay relay is operated and said signal delay relay is released.

6. In a telephone system, an operator position, an incoming trunk having a termination at said operator position, an incoming signal device at said position, a circuit for energizing said incoming signal, a calling bridge relay operated responsive to seizure of said trunk, a signal delay relay, a release delay relay, said signal delay relay and said release delay relay energized and thereafter operated responsive to operation of said calling bridge relay, operation of said signal delay relay effective for holding open said incoming signal circuit, means for rendering said means for rendering said signal and said release delay relays slow-to-operate being also effective to render said signal delay relay slow-to-release responsive to the operation of said release delay relay said release delay relay slow-to-operate, means controlled by said release delay relay for making said trunk busy and for de-energizing said signal delay relay, means jointly controlled by said signal delay relay and said release delay relay for energizing said incoming signal circuit when said signal delay relay is released and said release relay is operated.

7. In a telephone system, an operator position, an incoming trunk having a termination at said operator position, an incoming signal device at said position, a circuit for energizing said incoming signal device, a calling bridge relay operated responsive to seizure of said trunk, a signal delay relay, a release delay relay, said signal delay relay and said release delay relay energized and thereafter operated responsive to operation of said calling bridge relay, operation of said signal delay relay effective for holding open said incoming signal circuit, means for rendering said signal delay relay and said release delay relay slow-to-operate, other means for delaying the operation of said release delay relay a predetermined interval after the operation of said signal delay relay, said means for rendering said release delay relay and said signal delay relay slow-to-operate also effective for rendering said signal delay relay slow-to-release responsive to operation of said release delay relay, means controlled by said release delay relay for de-energizing said signal delay relay, and means jointly controlled by said signal delay relay and said release delay relay for energizing said incoming signal circuit when said signal delay relay is released and said release delay relay is operated.

References Cited in the file of this patent

UNITED STATES PATENTS 2,139,117 Gohorel ---------------- Dec. 6, 1938